Jan. 2, 1951 G. L. USSELMAN 2,536,330

SIGNALING SYSTEM

Filed July 28, 1945 4 Sheets-Sheet 1

INVENTOR
GEORGE L. USSELMAN.
BY H. S. Grover
ATTORNEY

Jan. 2, 1951 G. L. USSELMAN 2,536,330

SIGNALING SYSTEM

Filed July 28, 1945 4 Sheets-Sheet 2

INVENTOR
GEORGE L. USSELMAN.
BY H. S. Brown
ATTORNEY

SIGNALING SYSTEM

INVENTOR
GEORGE L. USSELMAN.
BY H. S. Grover
ATTORNEY

Jan. 2, 1951 G. L. USSELMAN 2,536,330

SIGNALING SYSTEM

Filed July 28, 1945 4 Sheets-Sheet 4

INVENTOR
GEORGE L. USSELMAN.
BY H. S. Grover
ATTORNEY

Patented Jan. 2, 1951

2,536,330

UNITED STATES PATENT OFFICE 2,536,330

SIGNALING SYSTEM

George L. Usselman, Port Jefferson, N. Y., assignor to Radio Corporation of America, a corporation of Delaware Application July 28, 1945, Serial No. 607,645

10 Claims. (Cl. 332—23)

Figure 1:
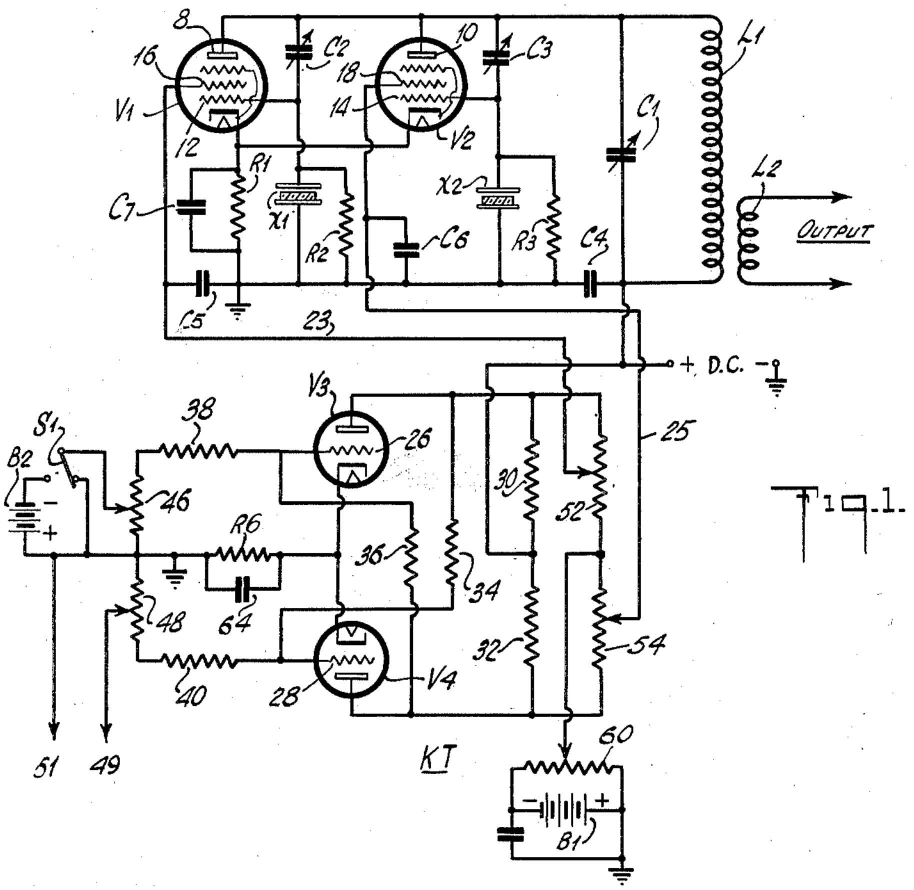

This application discloses an improved signalling system wherein oscillatory energy is generated and modulated as to frequency in accordance with signals. The signals may represent voice, telegraphy, facsimile, etc. The embodiments illustrated are particularly well adapted for production and transmission of energy representing telegraphy markings or facsimile signals, etc., and in describing my invention reference will be made to such signals although it will be understood that signals of other types may be used. In particular my system is useful in telegraphy and facsimile systems wherein signalling is accomplished by developing carrier energy which is shifted from one frequency which may be designated "space" condition to another frequency designated "mark" and representing "signal on" condition. Systems of this type are known in the radio and allied arts as space wave telegraphy or frequency shift telegraphy systems.

When intelligence is to be transmitted by producing oscillations and shifting the frequency thereof between two values by signals or by producing oscillations of two frequencies turned on and off alternately in accordance with signals, it is important that the oscillations may be readily keyed from the first frequency to the second frequency or readily turned on and off in accordance with signals, and yet the oscillations should be stabilized as to the two frequencies. Moreover, it is important that the extent of shift between the two frequencies be constant during operation. In many systems known heretofore in the prior art there is a tendency of the oscillations to drift in frequency. An object of my present invention is improvement of frequency shift telegraphy systems in this respect. To accomplish this I provide an oscillation generator system wherein two piezo crystals operating at different frequencies, one of which may represent mark and the other of which may represent space, are used. The set up is such that the oscillators operate at a common frequency in the absence of signalling currents. When signalling currents are applied the oscillators operate at or near one or the other crystal frequencies depending upon whether marking signal or spacing signal is on the received signalling current.

Frequency shift telegraphy systems using crystal stabilizers are known in the art. Many of these systems are complicated in nature and use a plurality of tubes and connections for the oscillation generating and modulating functions.

An object of my invention is to provide a simple and compact circuit arrangement for use in frequency shift telegraphy systems. This object is attained by the use of a pair of electron discharge devices in a simple though novel circuit arrangement including two piezoelectric crystals, one operating normally at mark frequency and the other operating normally at space frequency, separated from mark frequency by the desired frequency separation. Moreover, in my system the same pair of tubes serves as the modulating means, assuming the modulating currents at hand are of sufficient amplitude or intensity to control the tubes. The two piezoelectric crystals are preferably separated by a small frequency band such that in the system as operated they may be entrained to operate at the same frequency in the absence of signals.

In describing my invention in detail reference will be made to the attached drawings wherein Figs. 1 to 7 each illustrates by circuit connections and tube and electrode symbols and circuit element symbols the essential features of a frequency shift modulation system arranged in accordance with my invention. In all of the figures the generator comprises a pair of electron discharge devices V1 and V2 having their oscillator anodes connected in parallel by a tank circuit which in some embodiments also serves as an output circuit and has other functions as will appear in detail hereinafter. Moreover, in each modification two piezoelectric crystals are used, there being a crystal connected with the control grid and another electrode of each tube. Regeneration for production of oscillations is provided in each embodiment. In certain of the embodiments such as, for example, Figs. 2, 4, 5 and 6 (in one switch position) and 7, feedback takes place substantially only within the tube between the second or screen grid and the control grid. In the embodiments illustrated in Fig. 1 and in Figs. 3, 5 and 6 this feedback is supplemented by feedback derived from the oscillator anodes and from the tank circuit respectively. Switches are provided in the embodiments of Figures 6 and 7 for altering or modifying the feedback connections.

Referring to the drawings and in particular to Fig. 1, the electron discharge devices V1 and V2 have their anodes 8 and 10 tied together and coupled to one end of a parallel tuned tank circuit comprising an inductance L1 and a condenser C1 tuned to a frequency about the same as the frequency F1 at which crystal X1 would naturally operate and the frequency F2 at which crystal X2 would naturally operate. The crystal X1 is coupled between the control grid 12 and the cathode of tube V1, while the crystal X2 is coupled between the control grid 14 and the cathode of tube V2. The cathodes of both tubes are tied together and connected to ground by a common cathode biasing resistor R1. This biasing resistor is shunted by a radio frequency bypass condenser C7. The crystal X1 is shunted by a grid leak resistor R2 while the crystal X2 is shunted by a grid leak resistor R3. The control grid 12 is coupled to the anode 8 by a variable feedback condenser C2, while the control grid 14 is coupled to the anode 10 by a variable feedback condenser C3. Modulation may be applied as desired to the electrodes in the tubes V1 and V2. In the embodiment illustrated in Fig. 1 the modulation is applied to the screening electrodes 16 and 18 differentially from a tripping circuit described hereinafter. The screen grid electrodes 16 and 18 are tied to ground by radio frequency bypassing condensers C5 and C6 which are small enough to block passage of alternating current of the keying or modulation frequency. The lower end of inductance L1 and condenser C1 is connected by a radio frequency bypass condenser C4 to ground, so that the direct current source D. C. is shunted by this bypass condenser.

In operation the tank circuit including condenser C1 and L1 is tuned substantially to the frequencies of the crystals X1 and X2. More exactly the tank circuit is set for a frequency which makes the crystals possess inductive reactance when they oscillate. The crystals cannot appear inductive unless they do oscillate, and since there is no other inductance in the grid circuit oscillation cannot take place unless the crystals oscillate. In other words, the phase of the feedback through C3 and C2 is not proper for oscillations unless the grids are coupled to the cathodes inductively for R. F. The similarity between this operation and the Miller principle will be noted. The crystals X1 and X2 operate at frequencies separated by a small amount such as several hundred cycles and strictly speaking the tank circuit is tuned to a frequency slightly to one side of the crystal resonant frequencies but the tank circuit tuning is broad enough to operate at the frequencies of both crystals. If the tank circuit is so tuned that one crystal frequency is in the middle of the tank circuit resonance characteristic and the other crystal frequency slightly off on the side which makes the crystal inductive, both crystals oscillate. As arranged the tubes and circuits form one oscillator having two degrees of freedom in that it will operate at two different frequencies when controlled as described hereinafter. but operates at only one frequency at a time. When proper potentials are applied to the circuits and particularly to the tube electrodes, the crystals and the circuits start oscillating due to feedback through condensers C2 and C3 to the control grids 12 and 14 respectively. If the potentials on the control electrodes and screening electrodes are substantially similar the crystal oscillators will be entrained and operate as a single generator at this intermediate frequency. The resistance R1 is common to the cathode return circuits of both tubes and when R2 and R3 are of about the same value the control grids have like "direct current" biases. This is so also when the tubes V1 and V2 are differentially modulated because an increase of current through one tube is offset by a decrease of current through the other tube and vice versa.

If it is now assumed that the potential on the control electrode or screening electrode of tube V1 is changed then the frequency of operation of the circuit will be changed because one tube will have less gain than the other and will oscillate strongly and entrain or pull the other or weaker oscillator along with it so that now the system has shifted its frequency of operation to "mark" or "space" frequency depending on which tube and crystal is in control. In the embodiment illustrated I differentially key the screen grid potentials by means of a tripping and keying circuit KT such as disclosed in my United States application Serial No. 521,907, filed February 11, 1944, now Patent 2,461,456, dated February 8, 1949.

The keying or modulating circuit comprises a pair of electron discharge tubes V3 and V4 coupled in a tripping circuit similar in many respects to that shown in the Finch U. S. Patent 1,844,950. In these circuits the anode of V3 is coupled by a resistance 34 to the control grid 28 of V4, while the anode of V4 is coupled by a resistance 36 to the control grid 26 of tube V3, the arrangement being such that when current starts to flow in say tube V3 the potential drop at the anode thereof is impressed back on the control grid of tube V4 to bias this grid more negative so that more current flows through tube V3 and the current in the system is switched through and remains in V3 until something occurs which starts to increase the current flow through V4 so that its anode becomes less positive and this decreasing potential is supplied to the control grid of V3 to make it more negative and reduce current in tube V3 until the current of the system is switched through tube V4. The anode of V3 is connected to the direct current source by a resistance 30 while the anode of V4 is connected to the direct current source by the resistance 32. A potentiometer resistance 52 is connected between the anode of V3 and a point on the potentiometer resistance 60. A potentiometer resistance 54 is connected between the anode of V4 and a point on the resistance 60. Resistance 60 is in shunt to a source B1 of direct current potential, the positive end of which is grounded. The tap on potentiometer resistance 52 is connected by lead 23 to the screen grid 16 of tube V1 while the tap on potentiometer resistance 54 is connected by lead 25 to the screen grid 18 of tube V2. The connections are means for applying alternatingly positive and negative biases to the screen grids 16 and 18 of the tubes V1 and V2, or alternating high and low positive voltages to the screen grids 16 and 18 of the tubes V1 and V2 depending on the adjustments of potentiometers 52, 54 and 60.

The control grid 26 of tube V3 is connected to its cathode by a resistance 38, potentiometer resistance 46, and a common cathode resistance R6. The resistance R6 is shunted by a condenser 64 of sufficient value to bypass potentials of the keying frequency. The grid 28 of tube V4 is similarly connected to its cathode by a resistance 40, a potentiometer resistance 48, and the common cathode resistance R6. A source of potential B2 has its positive terminal connected to the cathodes and ground, and its negative terminal connected to a contact cooperating with the switch S1 to connect this source in shunt to a portion of resistance 46. The switch S1 has a second contact which when closed shunts or shorts a portion of the resistance 46. Keyed alternating current or direct current potentials may be applied to the modulation input leads at points 49 and 51.

The modulating or keying potentials represented by pulses of alternating current or direct current are applied to the leads 49 and 51. The arrangement is such that in the absence of signals the bias on the control grid 26 of tube V3 is negative and switches the current through the tube V4. This bias is obtained in part by the potential drop in cathode resistor R6. The grids 26 and 28 are at different potentials due to the potentiometer action of resistors 36, 38, and 46, and resistors 34, 40 and 48. The required negative bias may be produced by the potential drop in resistances 46 and 38 due to current in resistors 36 and the cathode current in R6. If this bias is insufficient it may be supplemented by negative potential from source B2 with switch S1 on the left hand contact. However, usually sufficient bias is obtained during operation without the source B2. The grid of V3 may be made less negative by moving S1 to the right hand contact to short a portion of resistance 46. It can be seen, however, that grids 26 and 28 are at different positive potentials. The grid 26 is less positive than is grid 28 with switch S1 in either position. When a strong negative potential is applied at lead 49, say, a keying impulse, the grid 28 becomes less positive than grid 26 and the current is tripped through tube V3. If during keying the bias produced in resistances 38 and 46 and R6 and on grid 26 is so highly negative that the negative marking potentials are unable to switch the current from tube V4 to tube V3, the switch S1 is closed in the right hand position to short out a portion of resistance 46.

With the current flowing through tube V4 the anode thereof is less positive and the anode of tube V3 is more positive, so that the potential on the screen grid 16 of tube V1 is higher than the potential on the screen grid 18 of tube V2 and the tube V1 in the oscillation generator circuit oscillates strongly while the tube V2 oscillates weakly and is pulled along so that the system operates at the frequency at which V1 operates, i. e., at a frequency approaching the frequency of crystal X1. This might be considered the spacing condition and also the carrier condition at which no marking signals are present. Now if a negative potential representing "mark" is applied at 49 the current through tube V4 is cut off and the current through tube V3 is maximum. Now the anode potential of tube V4 rises and the anode potential of tube V3 falls so that the potential on the screen grid 16 is less positive and the potential on the screen grid 18 is more positive and the oscillator including tube V2 oscillates strongly to pull the weak oscillator including tube V1 in step therewith at the frequency at which crystal X2 operates. This may be considered the marking frequency.

When the negative marking potential discussed in the immediate preceding paragraph is removed or is insufficient, the circuit trips current back through the tube V4 which, as stated above, is the spacing condition. If the potentials at 49 are alternating current pulses the tripping operation is the same because the negative alternations thereof make the grid 28 more negative and trip the current from tube V4 to tube V3. The positive variations of the alternating current are ineffective because the current is already maximum in tube V4 at this point in the operation. The alternating current keying potentials cause the tripping circuit to function without the aid of the source B2. However, when the signal is removed the source B2 may be included to hold the transmitter on space or carrier condition if necessary. This tripping action not only squares the wave but also limits the same.

The potentials of the anodes of tubes V3 and V4 depend on the positive potential applied to the adjacent terminals of resistances 30 and 32, and on the negative potential applied to the adjacent terminals of resistances 52 and 54. The potentials on grids 16 and 18 of tubes V1 and V2 depend on the position of the taps on resistances 52 and 54, and on the state of conductivity of the tubes V3 and V4. By adjusting potentiometers 52, 54 and 60, etc., the desired screen grid potentials varying differentially from a negative to a positive value or varying between positive values above and below an average positive value, are derived at the leads 23 and 25 and fed to the screen grids 16 and 18. The control potentials on the screen grids of tubes V1 and V2 may or may not operate these tubes alternatively to cut off, depending on how much frequency shift is desired and depending on which operation is most satisfactory.

Figure 2:
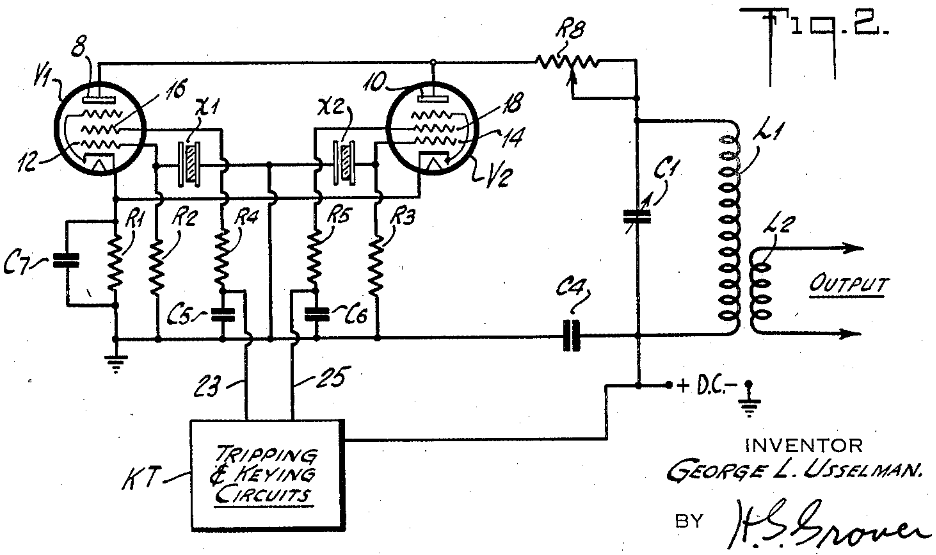

When the condensers C2 and C3 are removed as described hereinbefore the oscillation generator of Figure 1 then is quite similar to the arrangement shown in Fig. 2 in many respects. The embodiment of Figure 2 is a simple good oscillator. Oscillation takes place by virtue of the detuning of the tank circuit and feedback within the tubes. In order to expedite description of the arrangement of Fig. 2 numerals corresponding to those used in Fig. 1 have been used in so far as possible. Moreover, the keying and tripping circuit has been represented by a rectangle KT in Fig. 2. In the arrangement of Fig. 2 the crystals X1 and X2 are again connected between the control grids and ground. This is done by connecting one terminal of each crystal to a control electrode and the adjacent terminals of the two crystals together and to ground by a common lead. The tank circuit C1L1 is now coupled to the anodes 8 and 10 by way of a potentiometer resistance R8. I have found that the insertion of this resistance in the circuit between the anodes of tubes V1 and V2 and the tank circuit C1L1 is beneficial in reducing "pips" or sharp frequency changes during keying from "mark" to "space" frequency and vice versa. This resistance also improves the stability of the system. Preferably I insert a non-inductive resistance R8 at this point in the generating circuit. Preferably this resistance is variable or adjustable by steps to accommodate the circuit to crystals having different characteristics.

In Fig. 2 feedback is by way of the capacity within the tube between the control grid and the anode. The tank circuit is tuned to a frequency slightly off the frequencies of the crystals so that the crystals are inductive and oscillation takes place in accordance with the Miller principle. In this type of oscillator, the crystal is connected between the control grid and the cathode. The crystal oscillates at a frequency such that the crystal represents an inductance. The feedback energy is through the plate to grid capacity. When this circuit is analyzed it can be considered to be composed of the crystal (an inductance in this case), the grid leak resistor, and the plate to grid capacity. A vector diagram of the A.-C. current and voltage relations in this circuit shows that the voltage across the plate to grid capacity and that across the crystal (which is the same as from grid to cathode) are more than 90 degrees but not quite 180 degrees out of phase. This is a condition for supporting oscillations in an oscillator circuit. When the circuit is tuned as described above and the operating potentials applied, oscillations start and continue due to coupling within the tubes between the grids and anodes. Oscillations continue as long as the crystal also oscillates.

The screen grids 16 and 18 are connected by resistances R4 and R5 and leads 23 and 25 to the points on the tripping and keying circuit potentiometers. Condensers C5 and C6 short the tripping circuit ends of these resistances to ground for radio frequency potentials. The resistors R4 and R5 are connected in series with screen grids 16 and 18 to permit keying modulation of the screen grids but to prevent the screen grids from interfering with the RF feedback from the anodes 8 and 10 to the control grids 12 and 14.

Differential modulation as described hereinbefore is applied to the screen grids 16 and 18, here used only if keying, and this varies the frequency of the generated oscillations, in accordance with keyed potentials, from the frequency of crystal X1 to the frequency of crystal X2 and vice versa. This embodiment is extremely simple in nature and operation, and provided satisfactory results in frequency shift telegraphy. Pressure air gap crystals were used at X1 and X2 in testing this embodiment and the frequencies of operation were about 1933 kc. with about 200 cycles separation between $f1$ and $f2$, i. e., between the marking and spacing or no signal frequencies. Pressure air gap type crystals seem to respond best to frequency shift keying in these circuits.

Figure 3:
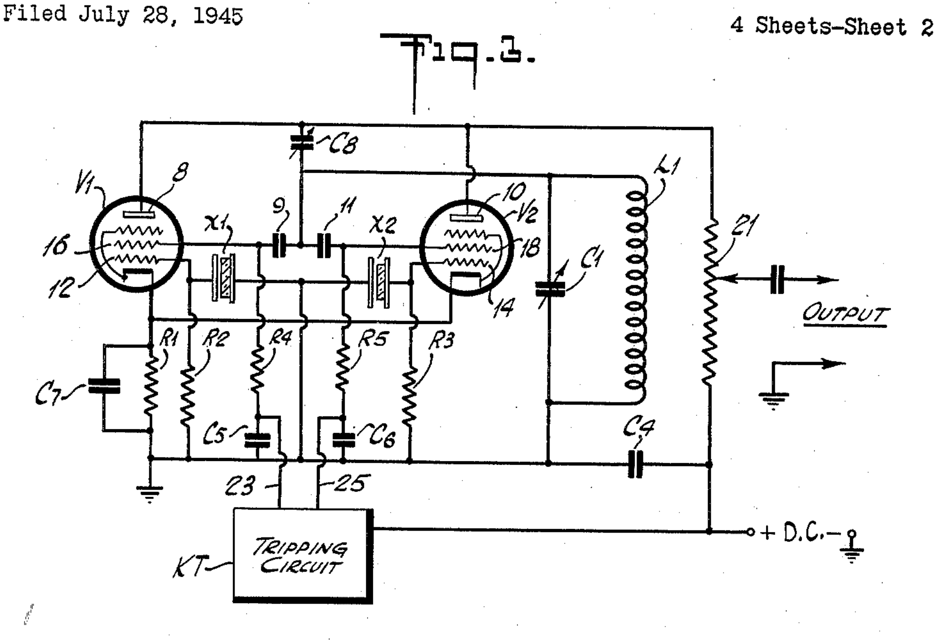

In the modification illustrated in Fig. 3 the screening electrodes 16 and 18 operate as anodes in the oscillation generating circuits. The electrodes 16 and 18 are coupled in parallel by condensers C9 and C11, and the junction point of these condensers is connected to one end of the parallel circuit C1L1. The crystals X1 and X2 are connected between the control grids and to ground (cathodes) as in Fig. 2. The screen electrodes 16 and 18 are also coupled to the main anodes 8 and 10 by condensers C9 and C11 and variable condenser C8. The main anodes are connected to a separate output circuit including a potentiometer resistance 21 and output leads. As to the oscillation generating circuits including the grid like anodes, the operation is in principle about the same as in Fig. 1 and in Fig. 2. Disregarding the action of condenser C8 and the main anodes I have generators of the three element tube type wherein generation takes place by tuning the tank circuit to a frequency slightly off the main frequency of the two crystals and by including the crystals between the control grids and cathodes. The output is primarily obtained through electron coupling within the tube. Some additional feedback from the main anodes to the screen grids may be obtained if desired by means of the variable condenser C8 connected therebetween. This enhances oscillation generation and strengthens the oscillations produced but only just enough capacity should be used to insure steady oscillations. In this system then the condenser C8 may be so adjusted that oscillations are generated irrespective of the type of crystals used at X1 and X2. As stated before, oscillations are started by adjusting the tank circuit C1L1 slightly off resonance for the frequencies of the crystals, and applying appropriate direct current potentials to the tube electrodes. After oscillation starts a slight adjustment of the tuning of tank circuit C1L1 may be required for the best operating conditions. For best operation the frequencies of the crystals X1 and X2 are near enough together so that both oscillate at all times but as the tubes V1 and V2 are keyed differentially first one then the other crystal takes control. The crystals are dimensioned for unlike natural frequencies but in these circuits they oscillate at the same frequency, i. e., if their natural frequencies are not too widely separated. The tube and crystal in control, i. e., having the highest screen grid potential which is applied differentially, oscillates more strongly and consequently "pulls" the frequency of the weaker oscillating tube and crystal along with it. This is the condition for best operation. If the natural frequencies of the crystals are too widely separated then the crystal oscillations will start and stop during the differential keying. This produces "pips" or sharp surges during keying between mark and space frequencies.

The tank circuit C1L1 of these generators is so arranged and operated as to have large circulating current. This produces a large "fly-wheel" effect so that the change in frequency is not so sudden. This is beneficial in preventing keying surges.

Figure 4:
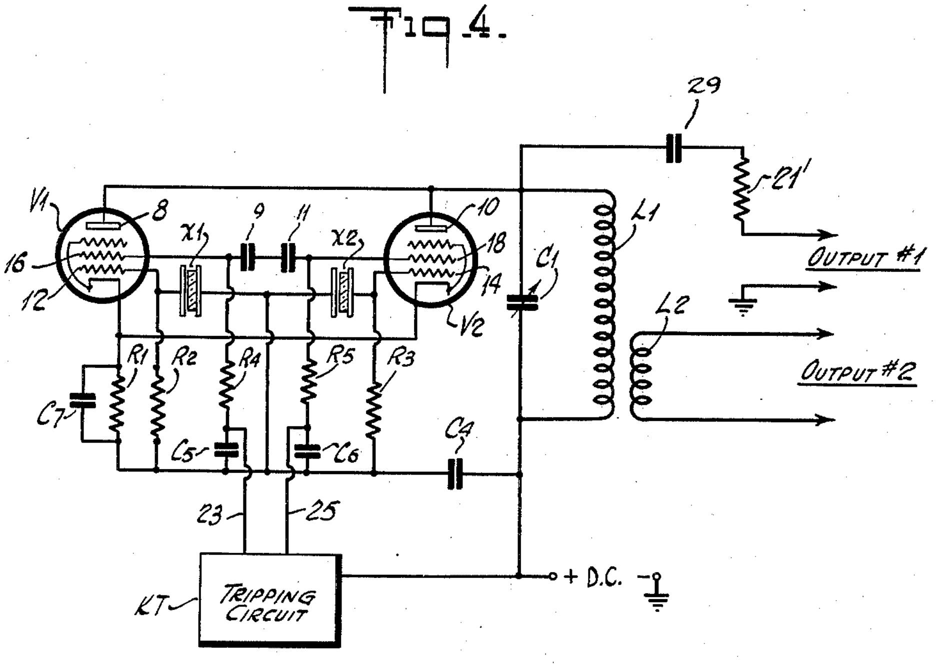

The circuit of Fig. 4 is a modification of the embodiment of Fig. 1 and also has features found in Figs. 2 and 3. In this embodiment the tank circuit C1L1 is again coupled at one end to the anodes. The crystals are connected between the control grids and cathodes. The anode circuits and grid circuits of the oscillator tubes are inductive by virtue of the tuning of C1L1. The screening electrodes as in Fig. 3 are tied together by condensers C9 and C11. There is no external feedback path, however, in this embodiment. Feedback takes place between the anodes 8 and 10 and the grids 12 and 14 through the internal tube capacities. This small amount of feedback is found sufficient to support sustained oscillations using the principle of the Miller generator. Moreover, in this embodiment there are shown two separate outputs, a first output as in Figs. 1 and 2 and an additional output which includes a coupling condenser 29 and a resistance 21' and ground. In principle the operation of this circuit is about the same as the operation of the embodiment of Fig. 2. The screen grids again serve the single purpose of modulation means. The modulation potentials are applied through resistors R4 and R5 as in Figs. 2 and 3. Oscillation takes place by virtue of the fact that the tank circuit is detuned slightly on one side of the mean frequency of operation of the system so that feedback takes place within the tube between the anodes and the control electrodes. The condensers C9 and C11 may be omitted but their use is beneficial. Condensers C9 and C11 act as filters for the keying waves. They tend to round off the square wave forms by short circuiting the higher keying harmonic frequencies. This is so for all the circuits using condensers in the position of C9 and C11. In some cases C9 and C11 in addition have other purposes, as for example, RF feedback in Fig. 3. This oscillation generator when tested operated very satisfactorily. In the embodiment tested crystal X1 had a natural frequency of 1933.0 kc., crystal X2 had a natural frequency of 1933.2 kc., and the system was modulated readily to produce strong oscillations which could be keyed from one frequency to the other in accordance with signals.

Figure 5:
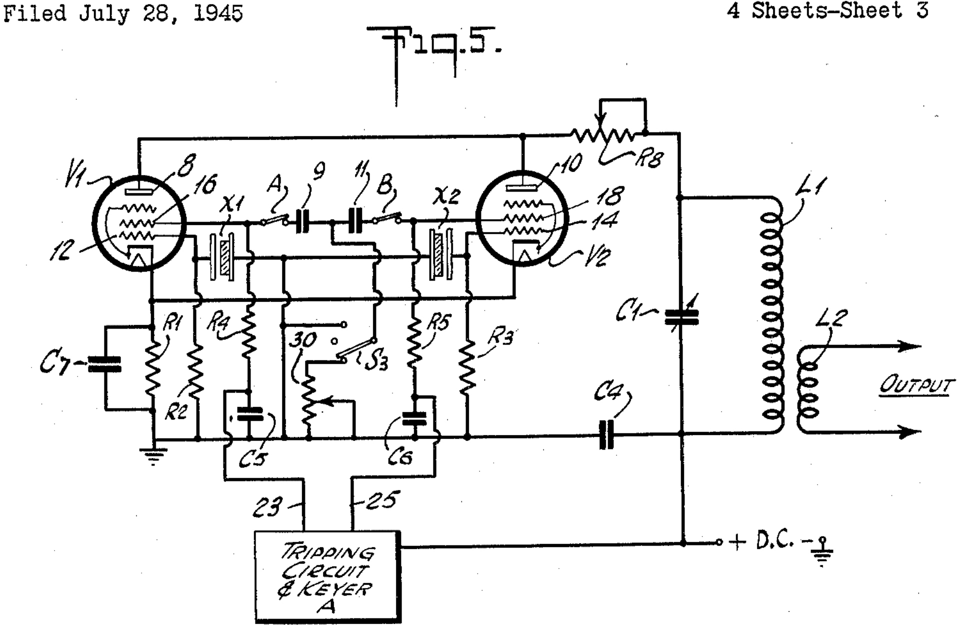

In the arrangement of Fig. 5 the tank circuit

C1L1 is coupled to the anodes by way of a potentiometer resistor R8 for the purpose described in connection with Fig. 2. The screen grids are again coupled together by condensers C9 and C11 when switches A and B are closed. The system then operates as described in connection with Fig. 4 when the switch S3 is open, i. e., on the middle contact. With the switches A and B open the arrangement is as in Fig. 1 except that there are no supplemental feedback condensers C2 and C3. In both cases oscillation generation takes place by virtue of the fact that the crystals are between the grids and cathodes and the tank circuit C1L1 is tuned slightly off the frequencies of the crystals. Feedback takes place through the capacity within the tube between the anode and control grid. With the switch S3 on the lower contact and switches A and B open there is substantially no coupling between the screen grids. I have found that various crystals sometimes require different operating conditions to give the best results. For example, some crystals operate better in the generating circuits with the screen grids substantially grounded for radio frequency voltages. Then switches A and B are closed and switch S3 is placed on the upper contact. When a large amount of coupling between the screen grids is desired contacts A and B are closed and switch S3 is placed on the middle contact. If switch S3 is placed on the lower contact and A and B closed the amount of coupling between the screen grids may be adjusted as desired by adjusting the point on potentiometer resistance 30.

Figure 6:
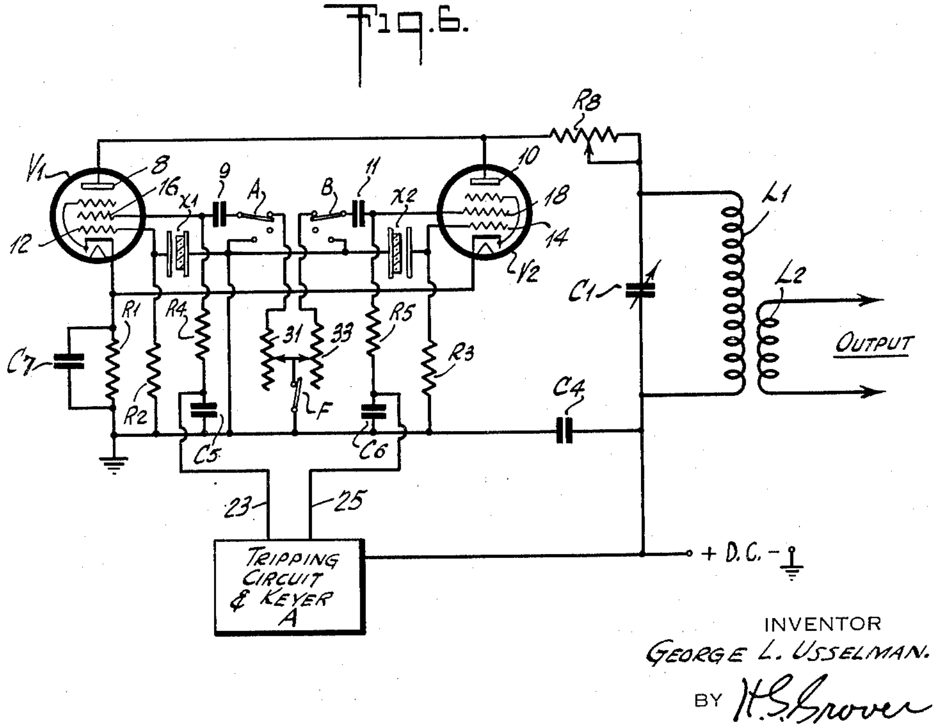

The embodiment of Fig. 6 is similar to the embodiment of Fig. 5 but differs therefrom in the following main respects. The switches A and B are at the terminals of C9 and C11 remote from the grids, and when closed in the upper position connect the grids to the two potentiometer resistances 31 and 33. Taps on these potentiometer resistances 31 and 33 are grounded when switch F is closed. With A and B in the position shown and F closed the coupling between the screen grids may be adjusted from a large amount of coupling to zero coupling, at which point the screen grids are also grounded for radio frequencies.

The screen grid switching in both Figs. 5 and 6 may be used to obtain various different RF feedback and signal filtering conditions. This allows different adjustments to suit different types of crystals. Also different amounts of signal filtering may be obtained by adjusting resistances 31 and 33, having switch F open and switches A and B closed upward.

With the switches A and B in the middle positions the screen grids are uncoupled and operating at high radio frequency potential. This presents the same conditions which exist in Fig. 2.

With the switches A and B in the lower positions the screen grids are uncoupled and connected directly to ground. This provides minimum RF feedback for use with sensitive crystals which might be damaged by stronger feedback. The condition in this case is similar to that shown in Fig. 1 omitting condensers C2 and C3.

In Fig. 6 switches and resistances are provided for changing to a large number of different operating conditions. I have found that various crystals sometimes require different operating conditions to give the best results. The screen grids of V1 and V2 may be coupled together through condensers C9 and C11 as in Fig. 4.

This is accomplished by closing switches A and B and moving potentiometer resistances 31 and 33 to points at which the resistance is all out of the coupling circuit with switch F open. However, some crystals may operate better with less coupling between the screen grids such as is the case when switch F is open, and switches A and B are on the upper contacts. Then resistances 31 and 33 are adjusted for the desired coupling. However, if no coupling is desired between the screen grids then switches A and B are set in the middle position. If it is desired that the screen grids be grounded for radio frequency voltages switches A and B are put in the lower position. If only a partial ground is desired then switches A and B are put in the upper position, switch F is closed, and the resistors 31 and 33 are adjusted to optimum position.

Figure 7:
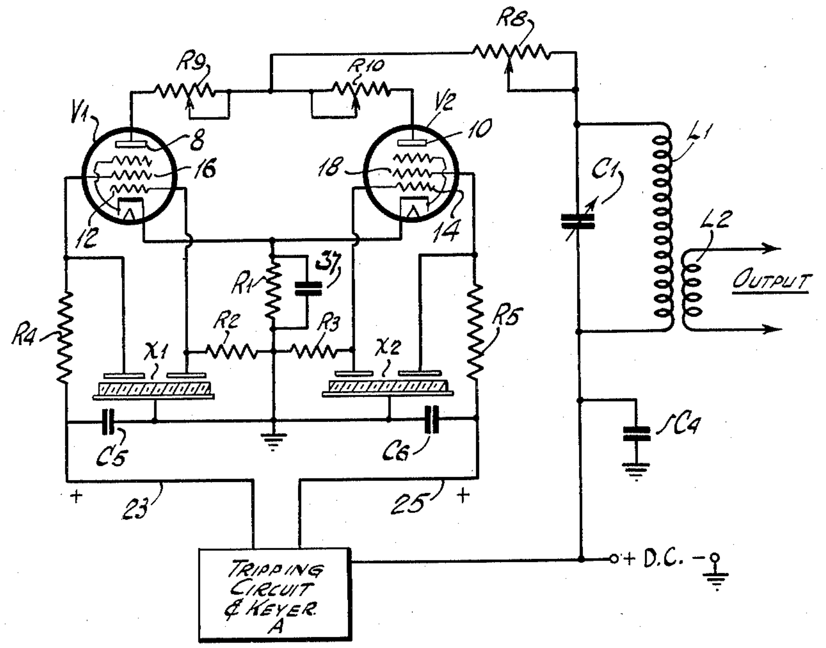

In the embodiment of Fig. 7 the anodes 8 and 10 are coupled together by adjustable resistances R9 and R10 and by these resistances and potentiometer resistance R8 to the tank circuit C1L1. The control grids and cathodes are connected about as in Fig. 1 by common cathode resistance R1 and grid leak resistances R2 and R3. The screen grid electrodes 16 and 18 are connected to the keying and tripping circuit about as in Fig. 3 by resistances R4 and R5 and leads 23 and 25. The crystals X1 and X2 are again between the grids 12 and 14 and ground, as in Fig. 1. However, the crystals are of the three electrode type with the crystals X1 and X2 also connected between the screen grids 16 and 18 and ground. Feedback takes place through the crystals from the screen grids to the control grids. The crystals operate effectively as resonant tank circuits with the control grids and screen grids excited by phase opposed R. F. voltages. The generators are in parallel and if there were no anode circuits there would be two generators operating at the two crystal frequencies, which should not differ by more than a few hundred cycles. The anodes are tied in parallel by the circuit C1L1 and this coupling forces the crystals to operate at the same frequency. The amount of coupling may be adjusted by resistances R9 and R10. The output circuit C1L1 may be said to be coupled to the generating electrodes mainly by the electron stream within the tube. These resistors R9 and R10 and resistor R8 stabilize the frequency of operation of the system.

If the crystals are not coupled together close enough to be entrained by the anode coupling described above then condensers C9 and C11, as in Figs. 5 and 6, may be added, and if desired, also resistors 31 and 33 and their connections as in Fig. 6.

Increasing the size of the screen grid bypass condensers C5 and C6 may be used to reduce or eliminate any undesirable keying clicks. The action is to round off the corners of the signal. This can not be carried too far if high speed keying is to be accomplished.

What is claimed is:

1. In a signalling system, a pair of electron discharge devices each having electrodes including a control grid, a cathode and an electrode serving as an oscillation generator anode, two crystals dimensioned to normally operate at different frequencies, a parallel inductance-capacitance circuit tuned to a frequency slightly different from the crystal frequencies, means, including couplings between the last-named electrodes of said devices and one end of said circuit and between the cathodes of said devices and the other end of said circuit, coupling the electrodes of each of said devices in a separate regenerative oscillation generator circuit, means for coupling one crystal between the control grid and another electrode of one device and for coupling the other crystal between the control grid and another electrode of the other device, whereby said separate regenerative generators have a tendency to operate at the frequency of the respective crystal coupled thereto, said tuned circuit being common to both generators to entrain the same for operation as one generator at a common mean frequency, means for differentially modulating the two devices in accordance with signals so that the two generators predominate alternatively, and an output circuit coupled to said generators.

2. In a signalling system, a pair of electron discharge devices each having electrodes including a control grid, a cathode, an anode and an auxiliary electrode, two crystals dimensioned to normally operate at different frequencies, a parallel inductance-capacitance circuit tuned to a frequency slightly different from the crystal frequencies, means, including couplings between the anodes of said devices and one end of said circuit and between the cathodes of said devices and the other end of said circuit, coupling the electrodes of each of said devices in a separate regenerative oscillation generator circuit, means for coupling one crystal between the control grid and another electrode of one device and for coupling the other crystal between the control grid and another electrode of the other device, whereby said separate regenerative generators have a tendency to operate respectively at the frequency of the crystal therein, said tuned circuit being common to both generators to entrain the same for operation as one generator at a common mean frequency, means for differentially modulating the potentials on said auxiliary electrodes in accordance with signals so that the two generators predominate alternatively, and an output circuit coupled to said tuned circuit.

3. In a signalling system, a pair of electron discharge devices each having electrodes including a control grid, an anode, a cathode and an electrode serving as an oscillation generator anode, two crystals dimensioned to normally operate at different frequencies, a circuit comprising parallel inductance and capacity tuned to a frequency slightly different than the crystal frequencies, means, including couplings between the oscillation generator anodes of said devices and one end of the parallel tuned circuit and between the cathodes of said devices and the other end of said parallel tuned circuit, coupling the electrodes of each of said devices in a separate regenerative oscillation generator circuit, means for coupling one crystal between the control grid and another electrode of one device and for coupling the other crystal between the control grid and another electrode of the other device whereby said separate regenerative generators have a tendency to operate respectively at the frequency of the crystal therein, said tuned circuit being common to both generators to entrain the same for operation as one generator at a common mean frequency, means for differentially modulating the potentials on the oscillation generator anodes in accordance with signals so that the two generators predominate alternatively, and an output circuit coupled to said first-mentioned anodes.

4. In a signalling system, a pair of electron discharge devices each having a control grid, a cathode, a screen grid and an anode, two crystals dimensioned to normally operate at different frequencies, a circuit comprising parallel inductance and capacity tuned to a frequency slightly different than the frequencies of said crystals, means, including couplings between one end of said tuned circuit and the screen grids and between the other end of said tuned circuit and the cathodes, coupling the electrodes of each of said devices in a separate regenerative oscillation generator circuit, means for coupling one crystal between the control grid and another electrode of one device and for coupling the other crystal between the control grid and another electrode of the other device whereby said separate regenerative generators have a tendency to operate respectively at the frequency of the crystal therein, said tuned circuit being common to both of said generators to entrain the same for operation at a common mean frequency, means for differentially modulating the potentials on the screen grids in accordance with signals so that the two generators predominate alternatively, and an output circuit coupled to said anodes.

5. In a signalling system, two electron discharge devices each having at least an electrode serving as an oscillation generator anode, a cathode and a control grid, two piezoelectric crystals, one tuned above and the other tuned below a desired operating frequency, a circuit parallel tuned to a frequency slightly different from the frequencies to which said crystals are tuned, a coupling connecting the electrodes serving as anodes in parallel to one end of said parallel tuned circuit, a coupling of low impedance to voltages of the said desired frequency between the other end of said parallel tuned circuit and the cathodes of said devices, leads connecting one crystal between the control grid and cathode of one device, leads connecting the other crystal between the control grid and cathode of the other device, feedback connections including in part in each device said electrode serving as an anode and said control grid for establishing regeneration in said devices and couplings for the production of oscillations on the order of said desired frequency, and connections to corresponding electrodes of said devices for differentially modulating the potentials thereon in accordance with signals.

6. In a signalling system, two electron discharge tubes each having an anode, a cathode, a control grid, and an auxiliary electrode, two piezoelectric crystals, one tuned above, the other tuned below a desired operating frequency, a circuit parallel tuned to a frequency about the same as the frequencies to which said crystals are tuned, a coupling connecting the anodes of said tubes in parallel to one end of said parallel tuned circuit, connections of low impedance to voltages of the said desired frequency between the other end of said parallel tuned circuit and the cathodes of said tubes, leads connecting one crystal between the control grid and the cathode of one tube, leads connecting the other crystal between the control grid and cathode of the other tube, means including a separate variable capacitor between the anode and control grid of each tube for establishing regeneration in said tubes and connections for the production of oscillations on the order of said desired operating frequency, and connections to said auxiliary electrodes for differentially modulating the potentials thereon in accordance with signals.

7. In a signalling system, two electron discharge tubes each having an anode, a cathode, a control grid, and a screen grid, two piezoelectric crystals, one tuned above, the other tuned below a desired operating frequency, a circuit parallel tuned to a frequency slightly different from the frequencies to which said crystals are tuned, a coupling connecting the said screen grids of said tubes in parallel to one end of said parallel tuned circuit, connections of low impedance to voltages of the said desired frequency between the other end of said parallel tuned circuit and the cathodes of said tubes, leads including a common portion connecting one crystal between the control grid and cathode of one tube and the other crystal between the control grid and cathode of the other tube, means including a condenser coupling the anodes of the tubes to the screen grids of the tubes for establishing regeneration in said tubes and connections for the production of oscillations on the order of said desired operating frequency, connections to the screen grids of said tubes for differentially modulating the potentials thereon in accordance with signals, and an output circuit coupled to the anodes of the tubes.

8. In a signalling system, two electron discharge tubes each having an anode, a cathode, a control grid, and a screen grid, two piezoelectric crystals, one tuned above, the other tuned below a desired operating frequency, a circuit parallel tuned to a frequency slightly different from the frequencies to which said crystals are tuned, a coupling connecting the anodes of said tubes in parallel to one end of said parallel tuned circuit, connections of low impedance to voltages of the said desired frequency between the other end of said parallel tuned circuit and the cathodes of said tubes, leads connecting one crystal between the control grid and the cathode of one tube, leads connecting the other crystal between the control grid and cathode of the other tube, means including capacitances in series between the screen grids of the tubes for establishing regeneration in said tubes and connections for the production of oscillations on the order of said desired operating frequency, connections to the screen grids of said tubes for differentially modulating the potentials thereon in accordance with signals, and an output circuit coupled to said anodes.

9. In a signalling system, two electron discharge tubes each having an anode, a cathode, a control grid, and an auxiliary electrode, two piezoelectric crystals, one tuned above, the other tuned below a desired operating frequency, a circuit parallel tuned to a frequency slightly different from the frequencies to which said crystals are tuned, a coupling connecting the anodes of said tubes in parallel to one end of said parallel tuned circuit, connections of low impedance to voltages of the said desired frequency between the other end of said parallel tuned circuit and the cathodes of said tubes, leads having a portion in common connecting one crystal between the control grid and cathode of one tube and the other crystal between the control grid and cathode of the other tube, means including two condensers in series between the said auxiliary electrodes of the tubes, and a connection including a variable resistance between adjacent terminals of the said two condensers and the cathodes of the tubes for adjustably establishing regeneration in said tubes and connections for the production of oscillations on the order of said desired operating frequency, connections to the auxiliary electrodes of said tubes for differentially modulating the potentials thereon in accordance with signals, and an output circuit coupled to the anodes of the tubes.

10. In a signalling system, two electron discharge tubes each having an anode, a cathode, a control grid, and an auxiliary electrode, two piezoelectric crystals, one tuned above, the other tuned below a desired operating frequency, a circuit parallel tuned to a frequency slightly different from the frequencies to which said crystals are tuned, a coupling connecting the anodes of said tubes in parallel to one end of said parallel tuned circuit, connections of low impedance to voltages of the said desired frequency between the other end of said parallel tuned circuit and the cathodes of said tubes, leads including a common portion connecting one crystal between the control grid and cathode of one tube and the other crystal between the control grid and cathode of the other tube, means including two condensers and two resistances in series between the two auxiliary electrodes, with a tap on each resistance connected to the cathodes of the tubes, for establishing regeneration in said tubes and connections for the production of oscillations on the order of said desired operating frequency, connections to said auxiliary electrodes of said tubes for differentially modulating the potentials thereon in accordance with signals, and an output circuit coupled to said tuned circuit.

GEORGE L. USSELMAN.

REFERENCES CITED

The following references are of record in the file of this patent:

UNITED STATES PATENTS

| Number | Name | Date |
|---|---|---|
| 2,304,388 | Usselman | Dec. 8, 1942 |
| 2,309,388 | Usselman | June 26, 1943 |
| 2,375,527 | Crosby | May 8, 1945 |